(12) United States Patent
Omura (10) Patent No.: US 9,508,037 B2
(45) Date of Patent: Nov. 29, 2016

(54) NON-CONTACT IC LABEL (71) Applicant: TOPPAN PRINTING CO., LTD., Tokyo (JP)

(72) Inventor: Kunio Omura, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/067,763

(22) Filed: Mar. 11, 2016

(65) Prior Publication Data

US 2016/0196486 A1     Jul. 7, 2016

Related U.S. Application Data (63) Continuation of application No. PCT/JP2014/074089, filed on Sep. 11, 2014.

(30) Foreign Application Priority Data

Sep. 12, 2013   (JP) ................. 2013-189786

(51) Int. Cl.
*G06K 19/077* (2006.01)
*B42D 25/305* (2014.01)
*H01Q 1/22* (2006.01)
*H01Q 9/16* (2006.01)

(52) U.S. Cl.
CPC ......... *G06K 19/0775* (2013.01); *B42D 25/305* (2014.10); *G06K 19/07754* (2013.01); *G06K 19/07775* (2013.01); *G06K 19/07786* (2013.01); *H01Q 1/2225* (2013.01); *H01Q 9/16* (2013.01)

(58) Field of Classification Search
CPC ........... B42D 25/305; G06K 19/0775; G06K 19/07754; G06K 19/07775; G06K 19/07786; H01Q 1/2225; H01Q 9/16
USPC ................................................ 235/487, 492
See application file for complete search history.

(56) References Cited

U.S. PATENT DOCUMENTS

| | | | | |
|---|---|---|---|---|
| 8,424,769 | B2* | 4/2013 | Kato | H01Q 1/2216 235/487 |
| 8,487,831 | B2* | 7/2013 | Yoshida | H01Q 1/2225 235/487 |
| 9,178,279 | B2* | 11/2015 | Ikemoto | G06K 19/07749 |
| 9,317,800 | B2* | 4/2016 | Omura | G06K 19/07758 |
| 2006/0214801 | A1* | 9/2006 | Murofushi | G06K 19/07749 340/572.7 |
| 2006/0220871 | A1* | 10/2006 | Baba | G06K 19/073 340/572.7 |
| 2009/0278687 | A1* | 11/2009 | Kato | G06K 19/07749 340/572.1 |

* cited by examiner

*Primary Examiner* — Seung Lee
(74) *Attorney, Agent, or Firm* — Foley & Lardner LLP (57) ABSTRACT

A non-contact IC label of the present invention includes an IC chip disposed on a magnetic sheet, a first antenna section and a second antenna section each connected to the IC chip, a circuit section which connects a first end portion of the first antenna section and a first end portion of the second antenna section to the IC chip, a first auxiliary antenna section which is disposed to project from a side on the second end portion of the first antenna section and a second auxiliary antenna section which is disposed to project from a side on the second end portion of the second antenna section, wherein the first antenna section and the second antenna section are formed in the same rectangular shape in a plan view.

8 Claims, 4 Drawing Sheets

NON-CONTACT IC LABEL

CROSS-REFERENCE TO RELATED PATENT APPLICATIONS

This application is a continuation application filed under 35 U.S.C. 111(a) claiming the benefit under 35 U.S.C. §§120 and 365(c) of PCT International Application No. PCT/JP2014/074089 filed on Sep. 11, 2014, which is based upon and claims the benefit of priority of Japanese Application No. 2013-189786, filed on Sep. 12, 2013, the entire contents of them all are hereby incorporated by reference.

TECHNICAL FIELD

The present invention relates to non-contact IC labels used in the UHF band and the SHF band.

BACKGROUND

Conventionally, wireless communication is performed between an RFID tag (non-contact IC label) and a reader or the like. However, when such an RFID tag is attached on an object to be adhered that is made of a metal, communication performance is lowered. In order to solve the above problem, various configurations for RFID tags have been proposed as described below.

For example, in electromagnetic induction type RFID tags which use radio waves in the 13.56 MHz band, a magnetic body (magnetic sheet) having high magnetic permeability is disposed between an antenna and an object to be adhered. Accordingly, the RFID tags can ensure a magnetic flux route between the antenna and the object to be adhered with reduced loss, and can be used on an object to be adhered that is made of a metal. Further, although communication performance is lowered, the thickness of the magnetic body may be reduced to, for example, 100 μm or less. Accordingly, thin metal-compatible RFID tags for objects to be adhered that are made of a metal can be manufactured.

On the other hand, in RFID tags using radio waves in the UHF band and the SHF band, a dielectric body or an air layer is often disposed between the antenna and the object to be adhered so as to ensure a gap between the antenna and the object to be adhered, thereby reducing the effect of the object to be adhered.

In this case, however, when a dielectric body having a thickness of 100 μm or an air layer having a thickness of 100 μm is disposed between the antenna and the object to be adhered, the RFID tags having the above configuration are strongly influenced by the object to be adhered made of a metal and fail to communicate, which is similar to the case of electromagnetic induction type RFID tags.

Therefore, it currently seems to be difficult to manufacture thin electromagnetic induction type RFID tags (having a thickness of few hundreds of μm or less).

As another type of RFID tags using radio waves in the UHF band and the SHF band, PTL 1 has proposed a non-contact IC label having a magnetic sheet disposed between the antenna and the object to be adhered.

CITATION LIST

Patent Literature

PTL 1: WO 2012/023511

SUMMARY OF THE INVENTION

Technical Problem

However, the non-contact IC label using radio waves described in PTL 1 does not have a sufficient communication range.

Moreover, in general, a non-contact IC label with smaller external dimensions and a lower cost is desired.

The present invention has been made in view of the above problem, and has an object of providing a non-contact IC label with improved communication range while trying to maintain the external dimensions and preventing increase in cost.

Proposed Solution to Problem

In order to improve or even solve the above problem, the present invention proposes the following solution.

A non-contact IC label according to one aspect of the present invention is characterized in that the non-contact IC label includes: a magnetic sheet having a first surface and a second surface opposite to the first surface; an IC chip disposed on the first surface of the magnetic sheet; a first antenna section which is disposed on the magnetic sheet, and has a first end portion connected to the IC chip and a second end portion disposed away from the first end portion in a first direction on the first surface of the magnetic sheet; a second antenna section which is disposed on the magnetic sheet, and has a first end portion connected to the IC chip and a second end portion disposed away from the first end portion in a direction opposite to the first direction; a circuit section disposed between the first end portion of the first antenna section and the first end portion of the second antenna section, connected to the first end portion of the first antenna section, the first end portion of the second antenna section, and the IC chip; a first auxiliary antenna section which is disposed on the magnetic sheet, positioned on the second end portion of the first antenna section and projects from a side of the first antenna section located at a position close to the circuit section so as to extend in a direction which intersects with the first direction; and a second auxiliary antenna section which is disposed on the magnetic sheet, positioned on the second end portion of the second antenna section and extends from a side of the second antenna section located at a position close to the circuit section so as to extend along a direction which intersects with the second direction, wherein the first antenna section and the second antenna section are formed in the same rectangular shape in a plan view of the first surface of the magnetic sheet.

Further, in the above aspect of the present invention, the first auxiliary antenna section and the second auxiliary antenna section may be formed in a rectangular shape in the plan view of the first surface of the magnetic sheet.

Further, in the above aspect of the present invention, a distal end of the first auxiliary antenna section may have a tip formed in a semi-circular shape and a distal end of the second auxiliary antenna section may have a tip formed in a semi-circular shape in the plan view of the first surface of the magnetic sheet.

Further, in the above aspect of the present invention, the non-contact IC label may further include a first additional antenna section which is disposed on the magnetic sheet and extends from the distal end of the first auxiliary antenna section in the second direction; and a second additional antenna section which is disposed on the magnetic sheet and extends from the distal end of the second auxiliary antenna section in the first direction.

Further, in the above aspect of the present invention, communication between the non-contact IC label and a data reading device may be performed via radio waves.

Advantageous Effects of Invention

According to the above aspect of the invention, the communication range may be improved while maintaining the external dimensions and while trying to prevent increase in cost.

DESCRIPTION OF REPRESENTATIVE EMBODIMENTS

With reference to FIGS. 1 to 11, one embodiment of a non-contact IC label according to one embodiment of the present invention will be described. A non-contact IC label according to the present embodiment is configured to communicate with a data reading device, which is not shown in the figure, by contactless communication via radio waves.

Figure 1:
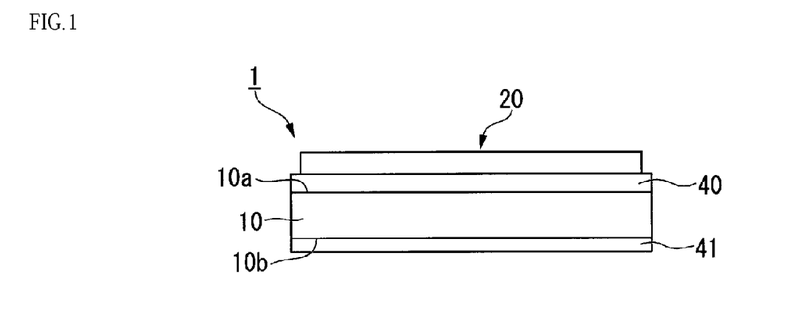
FIG. 1 is a side view which schematically shows a non-contact IC label according to one embodiment of the present invention.
Figure 2:
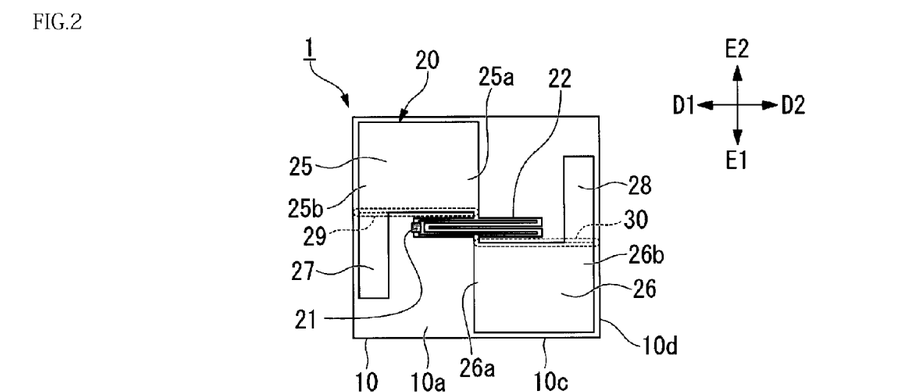
FIG. 2 is a plan view of the non-contact IC label according to one embodiment of the present invention.

As shown in FIGS. 1 and 2, a non-contact IC label 1 of the present embodiment includes a magnetic sheet 10, and a communication section 20 disposed on one surface (first surface) 10a of the magnetic sheet 10.

The magnetic sheet 10 may be made of a known flexible material suited to label application, such as a composite material made up of magnetic particles or magnetic flakes and plastic or rubber.

As shown in FIG. 2, the magnetic sheet 10 is formed in a rectangular shape in the plan view of the one surface 10a of the magnetic sheet 10 in the thickness direction of the magnetic sheet 10.

The communication section 20 is disposed at the center on the one surface 10a of the magnetic sheet 10. The communication section 20 includes an IC chip 21, a circuit section 22 connected to the IC chip 21, an antenna element (first antenna section) 25 and an antenna element (second antenna section) 26 connected to the IC chip 21 via a circuit section 22, and auxiliary element (first auxiliary antenna section) 27 and auxiliary element (second auxiliary antenna section) 28 connected to the antenna elements 25 and 26, respectively.

The IC chip 21 uses a known configuration and stores predetermined information. The stored information can be transmitted through an electric contact disposed on the IC chip 21, which is not shown, to the outside via radio waves by supplying radio wave energy via the electric contact by using radio waves.

In the present embodiment, the circuit section 22, the antenna element 25 and 26, and the auxiliary elements 27 and 28 are integrally formed by printing silver paste ink on a film, which is not shown, made of a material such as PET (polyethylene terephthalate).

The circuit section 22 is formed of a wiring meandering in a predetermined shape and is disposed between a first end portion 25a of the antenna element 25 and a first end portion 26a of the antenna element 26.

The circuit section 22 is electrically connected to the first end portion 25a of the antenna element 25, the first end portion 26a of the antenna element 26, and the electric contact of the IC chip 21.

The first end portion 25a of the antenna element 25 and the first end portion 26a of the antenna element 26 are disposed side by side in a direction E1, which will be described later.

The circuit section 22 is configured such that equal, predetermined impedance and resistance are generated between the first end portion 25a of the antenna element 25 and the electric contact of the IC chip 21 and between the first end portion 26a of the antenna element 26 and the electric contact of the IC chip 21.

In the plan view shown in FIG. 2, the antenna element 25 and the antenna element 26 are formed in the same rectangular shape.

The antenna element 25 is formed such that a second end portion 25b is disposed away from the first end portion 25a in a first direction D1 on the one surface 10a of the magnetic sheet 10. The first direction D1 is parallel to a side 10c of the magnetic sheet 10. The antenna element 26 is formed such that a second end portion 26b is disposed away from the first end portion 26a in a second direction D2 which is a direction opposite to the first direction D1.

In the plan view shown in FIG. 2, the auxiliary element 27 and the auxiliary element 28 are formed in the same rectangular shape.

The auxiliary element 27 is positioned on the second end portion 25b of the antenna element 25 and projects in the direction E1 from a side 29 of the antenna element 25 which is located at a position close to the circuit section 22 and extends so as to intersect with the first direction D1. The direction E1 is parallel to a side 10d which is adjacent to the side 10c of the magnetic sheet 10. The auxiliary element 27 extends from the antenna element 25 so as to cross a virtual extended line of a wiring end of the circuit section 22 which is parallel to the first direction D1 and located farthest from the antenna element 25. The auxiliary element 27 and the circuit section 22 are spaced from each other and are not directly in contact with each other. The end portion of the antenna element 25 in the first direction D1 and the end portion of the auxiliary element 27 in the first direction D1 are on the same plane.

The auxiliary element 28 is positioned on the second end portion 26b of the antenna element 26 and projects in a direction E2 from a side 30 of the antenna element 26 which is located at a position close to the circuit section 22 and extends so as to intersect with the second direction D2. The direction E2 is a direction opposite to the direction E1. The auxiliary element 28 extends from the antenna element 26 so as to cross a virtual extended line of a wiring end of the circuit section 22 which is parallel to the second direction D2 and located farthest from the antenna element 26. The auxiliary element 28 and the circuit section 22 are spaced from each other and are not directly in contact with each other. The end portion of the antenna element 26 in the second direction D2 and the end portion of the auxiliary element 28 in the second direction D2 are on the same plane.

As shown in FIG. 1, the magnetic sheet 10 and the communication section 20 are connected to each other via an adhesion layer 40. An adhesion layer 41 is disposed on the other surface (second surface) 10b of the magnetic sheet 10.

The adhesion layer 40 and adhesion layer 41 can be made of a known adhesive such as synthetic rubber based adhesive and acrylic based adhesive as appropriate.

The non-contact IC label 1 of the present embodiment has a configuration as described below. The non-contact IC label 1 is devised to improve (increase) the communication range of a conventional non-contact IC label 100 shown in FIG. 3 of PTL 1. The non-contact IC label 100 is configured not to include the auxiliary elements 27 and 28, unlike the non-contact IC label 1 of the present embodiment. That is, the non-contact IC label 100 includes the same magnetic sheet 10, the IC chip 21, the circuit section 22, the antenna elements 25 and 26, and the adhesion layers 40 and 41 as those of the non-contact IC label 1.

Figure 3:
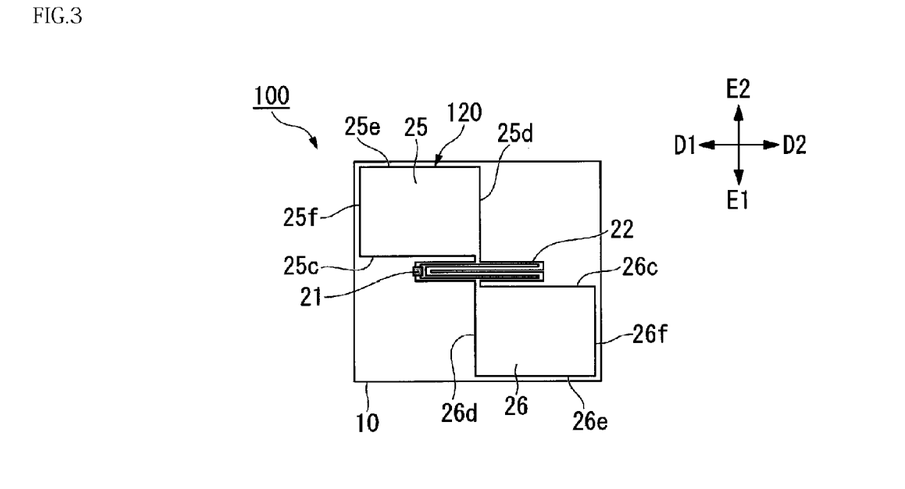
FIG. 3 is a plan view of a conventional non-contact IC label.

A communication section 120 in the non-contact IC label 100 is formed by printing the circuit section 22, the antenna element 25 and the antenna element 26 with silver paste ink on the underside of a film, which is not shown in the figure, made of a material such as PET.

By providing an auxiliary element on the antenna elements 25 and 26 of the non-contact IC label 100, the communication range of the non-contact IC label 100 can be increased.

In order to examine the arrangement of the auxiliary element that achieves the above purpose, the following experiments were conducted.

(Materials and Tools Used for Experiment)

The following materials and tools were used for experiment. For the tools, see FIG. 4.

Magnetic sheet 10: NRCO25 (thickness 250 μm), manufactured by Daido Steel Co., Ltd.

Size of the magnetic sheet 10: 41 mm×38 mm, 50 mm×45 mm

IC chip 21: UCODE G2iL, manufactured by NXP Co., Ltd.

The circuit section 22, and the antenna elements 25 and 26:

Size of the antenna elements 25 and 26: 20 mm×15 mm

Pattern printing (thickness 8 μm) by silver paste ink on the PET film (thickness 50 μm)

Elements except for the IC chip 21 were manufactured by own company.

Auxiliary element: A thin film of aluminum having the thickness of 12 μm

Reader/Writer R1: Reader/Writer for 950 MHz band RFID, RF-RW002 (maximum output 1 W 30 dBm), manufactured by Mitsubishi Electric Corporation Reading antenna R2: Antenna for 950 MHz band RFID (maximum gain 6 dBi)

Fixed attenuator R3: AT-105 (Attenuation 5 dB), manufactured by Hirose Electric Co., Ltd.

A data reading device R10 was made up of the reader/writer R1, the reading antenna R2, and the fixed attenuator R3.

Metal plate W: made of stainless steel (250 mm×250 mm×0.5 mm)

(Fabrication of Sample)

In the experiment, an auxiliary element was disposed at various positions on the antenna element 25 and the antenna element 26, and the communication range of the non-contact IC label having the auxiliary element was measured.

Figure 4:
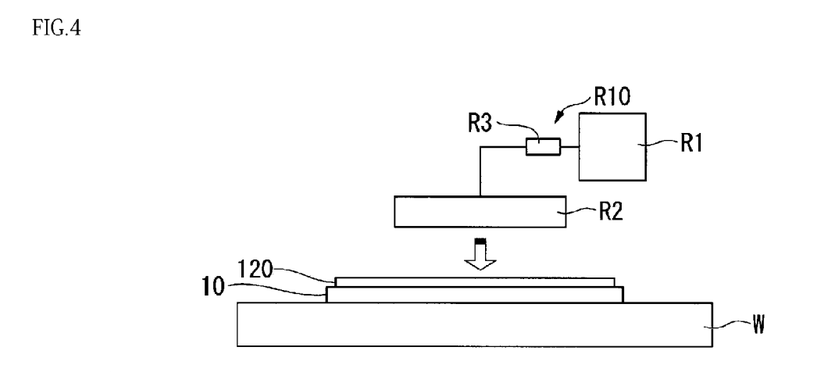
FIG. 4 is a side view which shows a procedure of experiment using the conventional non-contact IC label.

As shown in FIG. 4, the magnetic sheet 10 was disposed on the metal plate W made of stainless steel, and the above communication section 120 was placed on the magnetic sheet 10 at a position shown in FIG. 3 on the magnetic sheet 10. The IC chip 21 was mounted on the circuit section 22 by using an ACP (anisotropic conductive paste) connection method.

The antenna elements 25 and 26 and the auxiliary element were electrically connected by stacking part of the auxiliary element on the antenna elements 25 and 26 in the thickness direction of the magnetic sheet 10. The auxiliary element used for the experiment was a conductor of an aluminum film (aluminum foil, a thin film of aluminum) having a thickness of 12 μm, and was processed by using a cutter to be formed into the shape of the auxiliary element as shown in the figure, which will be described later.

Although not shown in FIG. 4, a PET film having 25 μm thickness which corresponds to the adhesion layer 41 shown in FIG. 1 was stacked between the metal plate W made of a stainless steel and the magnetic sheet 10 in the thickness direction. Further, a PET film having 50 μm thickness which corresponds to the adhesion layer 40 shown in FIG. 1 was stacked between the communication section 120 and the magnetic sheet 10 in the thickness direction.

Those PET films used in the experiment were assumed to have an inherent dielectric constant close to the dielectric constant of the adhesive used for the adhesion layers 40 and 41. Further, those PET films had the same thickness as that of the adhesion layers 40 and 41.

Experiment Procedure

A styrene foam, which was not shown in the figure, was disposed on the PET film, and the layers from the metal plate W to the styrene foam were tied together by using a band having an insulation property in order to ensure connection between the antenna elements 25 and 26 and the auxiliary element and enhance adhesiveness between the respective layers of the PET films which correspond to the adhesion layers 40 and 41 and the magnetic sheet 10.

After that, the reading antenna R2 shown in FIG. 4 was brought close to the styrene foam to read the information stored in the IC chip 21 via radio waves. Then, the maximum value (communication range) that the reading antenna R2 can read the information from the communication section 120 in a non-contact manner was obtained. It was known that a styrene foam hardly affects the measurement result of the communication range.

After the measurement in one specification was finished, the band was removed, the auxiliary element was removed to be repositioned or replaced with another auxiliary element having a different shape and again tied by using a band, and then, the measurement was conducted.

The reader/writer R1 and the reading antenna R2 used for the experiment were provided by mounting the non-contact IC label 100 on the metal plate W so that the high output reader/writer and the antenna for UHF band can read the information in a certain extent of the communication range.

Although the maximum output of the reader/writer R1 was 1 W (30 dBm), the fixed attenuator R3 of −5 dB was connected to a coaxial cable which connects the reader/writer R1 and the reading antenna R2 so as to attenuate the output of the reader/writer R1 to 0.3 W (25 dBm) for experimental convenience.

FIG. 3 shows the position of the side of each of the antenna elements 25 and 26 on which the auxiliary element is to be mounted. In the antenna element 25 formed in a rectangular shape, a side located in the direction E1 as seen from the center of the antenna element 25 was referred to as a side 25c, a side located in the second direction D2 was referred to as a side 25d, a side located in the direction E2 was referred to as a side 25e, and a side located in the first direction D1 was referred to as a side 25f. Similarly, in the antenna element 26 formed in a rectangular shape, a side located in the direction E2 as seen from the center of the antenna element 26 was referred to as a side 26c, a side located in the first direction D1 was referred to as a side 26d, a side located in the direction E1 was referred to as a side 26e, and a side located in the second direction D2 was referred to as a side 26f.

In the experiment, the auxiliary element was provided on each of the four sides of the antenna elements 25 and 26, and the communication ranges were measured in sequence. In all the experiments, both the antenna elements 25 and 26 were sized at 20 mm×15 mm (20 mm in the first direction D1 or in the second direction D2) and the auxiliary elements were sized at 5 mm×5 mm.

The auxiliary element was connected to the antenna elements 25 and 26 so that the side of the auxiliary element overlaps part of the side 25c to 25f of the antenna element 25 or part of the side 26c to 26f of the antenna element 26.

Experiment 1

Figure 5:
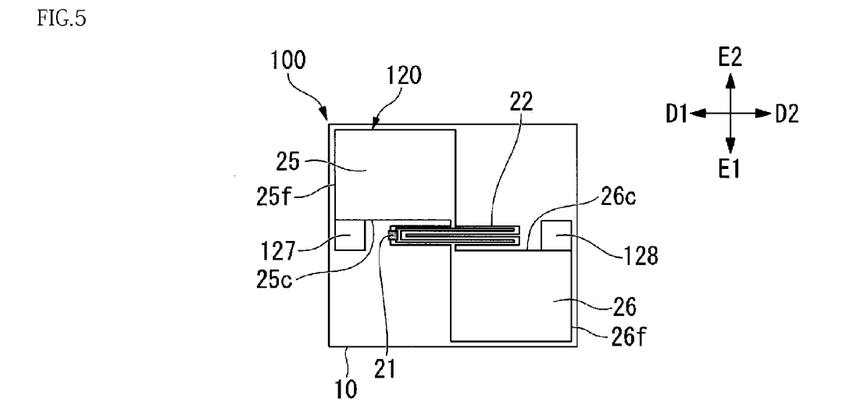
FIG. 5 is a plan view which shows an example in which an auxiliary element is connected to an antenna element of the conventional non-contact IC label.

First, as shown in FIG. 5, an auxiliary element 127 was disposed so that the side of the auxiliary element 127 which was located in the direction E2 as seen from the center of the auxiliary element 127 overlapped the side 25c of the antenna element 25, and the side 25f of the antenna element 25 and the side of the auxiliary element 127 which was located in the direction first direction D1 as seen from the center of the auxiliary element 127 were aligned in line. An auxiliary element 128 was disposed so that the side of the auxiliary element 128 which was located in the direction E1 as seen from the center of the auxiliary element 128 overlapped the side 26c of the antenna element 26, and the side 26f of the antenna element 26 and the side of the auxiliary element 128 which was located in the second direction D2 as seen from the center of the auxiliary element 128 were aligned in line.

In the experiment, the communication range was measured for each of the non-contact IC label 100 having the above auxiliary elements 127 and 128 and the conventional non-contact IC label 100 which does not have the above auxiliary elements 127 and 128. The magnetic sheet 10 used for the experiment was sized at 41×38 mm.

(Result 1)

The experimental results were as follows.
The communication range without auxiliary elements 127 and 128: 290 mm
The communication range with auxiliary elements 127 and 128: 350 mm From the above experimental results, it was revealed that the communication range was improved when the auxiliary elements 127 and 128 were provided on the side 25c of the antenna element 25 and the side 26c of the antenna element 26, respectively.

Furthermore, only in the Experiment 1, additional measurement of the communication range was conducted for each of the auxiliary elements 127 and 128 when they have the lengths of 10 mm and 15 mm in the direction E1 without changing the positions of the auxiliary elements 127 and 128 relative to the antenna elements 25 and 26, respectively. The experimental results were as follows.

The communication range when the auxiliary elements 127 and 128 each have the length of 10 mm: 350 mm
The communication range when the auxiliary elements 127 and 128 each have the length of 15 mm: 350 mm From the above experimental results, it was revealed that the communication range was still improved even though the auxiliary elements 127 and 128 have a longer length.

Experiment 2

Figure 6:
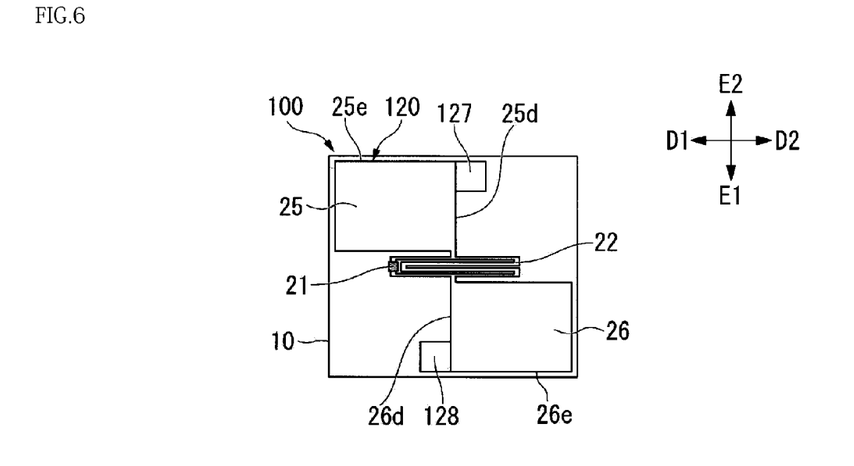
FIG. 6 is a plan view which shows an example in which an auxiliary element is connected to an antenna element of the conventional non-contact IC label.

Then, as shown in FIG. 6, the auxiliary element 127 was disposed so that the side of the auxiliary element 127 which was located in the first direction D1 as seen from the center of the auxiliary element 127 overlapped the side 25d of the antenna element 25, and the side 25e of the antenna element 25 and the side of the auxiliary element 127 which was located in the direction E2 as seen from the center of the auxiliary element 127 were aligned in line. The auxiliary element 128 was disposed so that the side of the auxiliary element 128 which was located in the second direction D2 as seen from the center of the auxiliary element 128 overlapped the side 26d of the antenna element 26, and the side 26e of the antenna element 26 and the side of the auxiliary element 128 which was located in the direction E1 as seen from the center of the auxiliary element 128 were aligned in line.

In the above conditions, the same experiment as the above Experiment 1 was conducted. Further, the magnetic sheet 10 used for Experiment 2 had the same size as that of Experiment 1.

(Result 2)

The experimental results were as follows.
The communication range without auxiliary elements 127 and 128: 290 mm
The communication range with auxiliary elements 127 and 128: 280 mm From the above experimental results, it was revealed that the communication range was decreased when the auxiliary elements 127 and 128 were provided on the side 25d of the antenna element 25 and the side 26d of the antenna element 26, respectively.

The auxiliary element 127 can be displaced in the direction E1 from the position shown in FIG. 6, in which the side 25e of the antenna element 25 and the side of the auxiliary element 127 which was located in the direction E2 as seen from the center of the auxiliary element 127 were aligned in line, so that the auxiliary element 127 is positioned in the center part of the side 25d, or alternatively, at a position close to the circuit section 22 to an extent not to be in contact with the circuit section 22. The auxiliary element 128 can also be displaced in the direction E2 similarly to the auxiliary element 127.

Additional measurement was conducted for each of the auxiliary element 127 displaced in the direction E1 and the auxiliary element 128 displaced in the direction E2. Although the experimental results were not shown, it was revealed that the communication range was not improved regardless of displacement of the positions of the auxiliary elements 127 and 128.

Experiment 3

Figure 7:
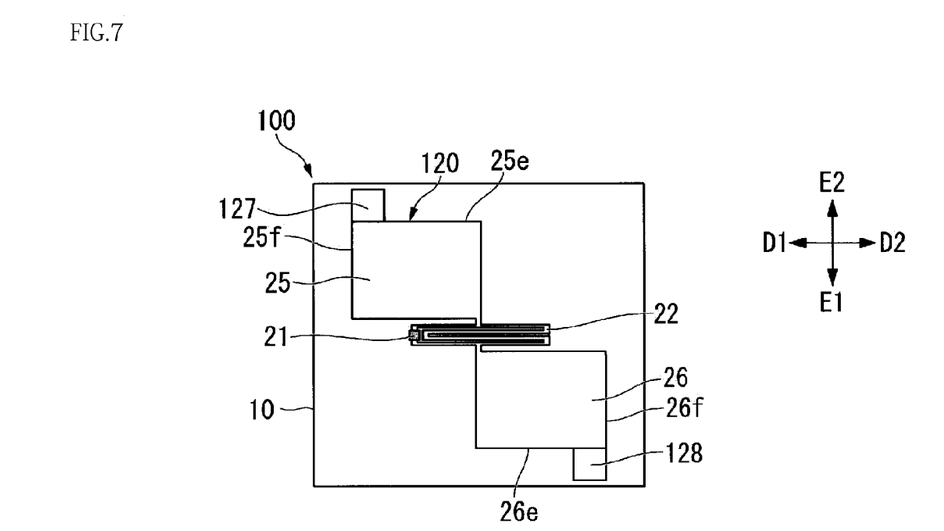
FIG. 7 is a plan view which shows an example in which an auxiliary element is connected to an antenna element of the conventional non-contact IC label.

Then, as shown in FIG. 7, the auxiliary element 127 was disposed so that the side of the auxiliary element 127 which was located in the direction E1 as seen from the center of the auxiliary element 127 overlapped the side 25*e* of the antenna element 25, and the side 25*f* of the antenna element 25 and the side of the auxiliary element 127 which was located in the direction first direction D1 as seen from the center of the auxiliary element 127 were aligned in line. The auxiliary element 128 was disposed so that the side of the auxiliary element 128 which was located in the direction E2 as seen from the center of the auxiliary element 128 overlapped the side 26*e* of the antenna element 26, and the side 26*f* of the antenna element 26 and the side of the auxiliary element 128 which was located in the second direction D2 as seen from the center of the auxiliary element 128 were aligned in line.

In the above conditions, the same experiment as the above Experiment 1 was conducted.

In this configuration, however, since the auxiliary elements 127 and 128 project outward from the existing label frame (the outer periphery of the magnetic sheet 10), the magnetic sheet 10 used for Experiment 3 was sized at 50 mm×45 mm as shown in FIG. 7, which was larger than the magnetic sheet 10 used for Experiment 1.
(Result 3)
The experimental results were as follows.
The communication range without auxiliary elements 127 and 128: 360 mm
The communication range with auxiliary elements 127 and 128: 340 mm The above experimental results showed that the communication range without auxiliary elements 127 and 128 was 360 mm, which was large compared to Result 1 and Result 2, since the magnetic sheet 10 had a large size of 50 mm×45 mm. It was revealed that the communication range was decreased when the auxiliary elements 127 and 128 were provided on the side 25*e* of the antenna element 25 and the side 26*e* of the antenna element 26, respectively.

The auxiliary element 127 can be displaced in the second direction D2 from the position shown in FIG. 7, in which the side 25*f* of the antenna element 25 and the side of the auxiliary element 127 which was located in the first direction D1 as seen from the center of the auxiliary element 127 were aligned in line, so that the auxiliary element 127 is positioned in the center part of the side 25*e*, or alternatively, at a position close to the circuit section 22. The auxiliary element 128 can also be displaced in the first direction D1 similarly to the auxiliary element 127.

Additional measurement was conducted for each of the auxiliary element 127 displaced in the second direction D2 and the auxiliary element 128 displaced in the first direction D1. Although the experimental results were not shown, it was revealed that the communication range was not improved regardless of displacement of the positions of the auxiliary elements 127 and 128.

Experiment 4

Figure 8:
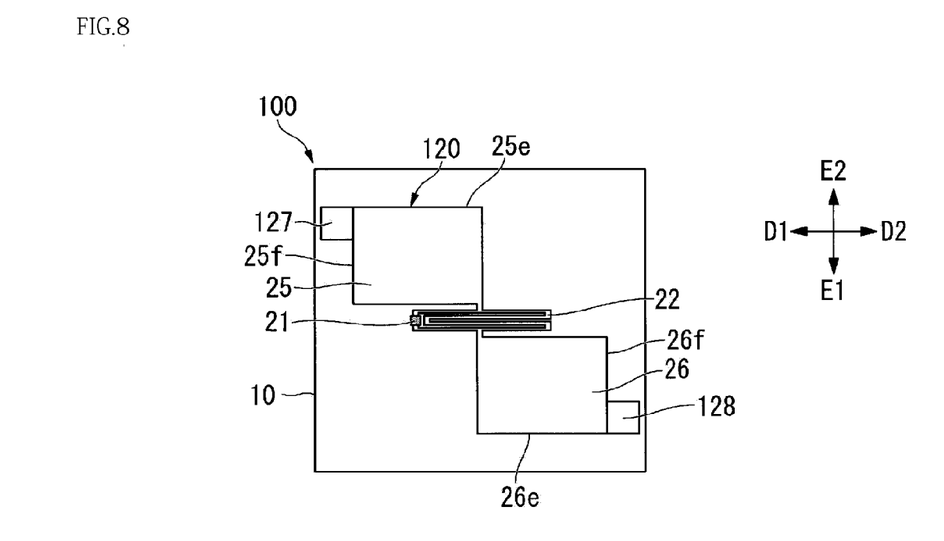
FIG. 8 is a plan view which shows an example in which an auxiliary element is connected to an antenna element of the conventional non-contact IC label.

Then, as shown in FIG. 8, an auxiliary element 127 was disposed so that the side of the auxiliary element 127 which was located in the second direction D2 as seen from the center of the auxiliary element 127 overlapped the side 25*f* of the antenna element 25, and the side 25*e* of the antenna element 25 and the side of the auxiliary element 127 which was located in the direction E2 as seen from the center of the auxiliary element 127 were aligned in line. An auxiliary element 128 was disposed so that the side of the auxiliary element 128 which was located in the first direction D1 as seen from the center of the auxiliary element 128 overlapped the side 26*f* of the antenna element 26, and the side 26*e* of the antenna element 26 and the side of the auxiliary element 128 which was located in the direction E1 as seen from the center of the auxiliary element 128 were aligned in line.

In the above conditions, the same experiment as the above Experiment 3 was conducted.

In this configuration, however, since the auxiliary elements 127 and 128 project outward from the existing label frame of the magnetic sheet 10 similarly to the above Experiment 3, the magnetic sheet 10 used for Experiment 4 had the same size as that of Experiment 3.
(Result 4)
The experimental results were as follows.
The communication range without auxiliary elements 127 and 128: 360 mm
The communication range with auxiliary elements 127 and 128: 360 mm The above experimental results showed that the communication range without auxiliary elements 127 and 128 was 360 mm, which was large compared to Result 1 and Result 2, since the magnetic sheet 10 had a large size as the same as that of the above Experiment 3. It was revealed that the communication range was not improved when the auxiliary elements 127 and 128 were provided on the side 25*f* of the antenna element 25 and the side 26*f* of the antenna element 26, respectively.

The auxiliary element 127 can be displaced in the direction E1 from the position shown in FIG. 8, in which the side 25*e* of the antenna element 25 and the side of the auxiliary element 127 which was located in the direction E2 as seen from the center of the auxiliary element 127 were aligned in line, so that the auxiliary element 127 is positioned in the center part of the side 25*f*, or alternatively, at a position close to the circuit section 22. The auxiliary element 128 can also be displaced in the direction E2 similarly to the auxiliary element 127.

Additional measurement was conducted for each of the auxiliary element 127 displaced in the direction E1 and the auxiliary element 128 displaced in the direction E2. Although the experimental results were not shown, it was revealed that the communication range was not improved regardless of displacement of the positions of the auxiliary elements 127 and 128.

From the above Experiments 1 to 4, it was revealed that the communication range was improved when the auxiliary elements 127 and 128 were positioned as in Experiment 1.

On the other side, it was revealed that the communication range was not improved when the auxiliary elements 127 and 128 were positioned as in Experiments 2 to 4.

Accordingly, the configuration of the conventional non-contact IC label 100 having the auxiliary elements 127 and 128 arranged at positions of Experiment 1 is the configuration of the non-contact IC label 1 of the present embodiment, which is shown in FIG. 2.

In this case, the auxiliary elements 127 and 128 arranged at positions of Experiment 1 are the auxiliary elements 27 and 28.

As described above, according to the non-contact IC label 1 of the present embodiment, the communication range can be improved by providing the auxiliary elements 27 and 28 on the conventional non-contact IC label 100.

As shown in FIG. 2, the auxiliary elements 27 and 28 are disposed at positions which do not cause increase in the external dimensions of the non-contact IC label 100 when the auxiliary elements 27 and 28 are provided on the conventional non-contact IC label 100. Accordingly, in the non-contact IC label 1, the communication range can be improved while maintaining the external dimensions of the conventional non-contact IC label 100.

Since the auxiliary elements 27 and 28 can be formed integrally with the circuit section 22 and the antenna elements 25 and 26 by printing silver paste ink on the film, the manufacturing cost of the non-contact IC label 1 can be reduced.

The configuration of the non-contact IC label 1 of the present embodiment can be modified as described below.

Figure 9:
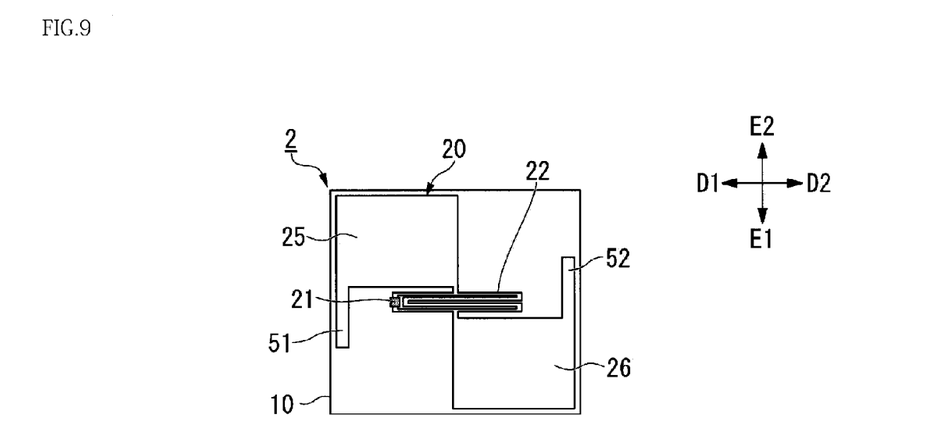
FIG. 9 is a plan view of the non-contact IC label according to a modified example of one embodiment of the present invention.

In a non-contact IC label 2 shown in FIG. 9, the auxiliary elements 51 and 52 may have a length (width) of 2 mm in the first direction D1. This width of the auxiliary elements 51 and 52 is smaller than the width of 5 mm of the auxiliary elements 127 and 128 of Experiment 1.

In the non-contact IC label 2 having the above configuration, it is also revealed from an additional experiment that the communication range can be improved compared to the conventional non-contact IC label 100, although the effect is smaller than the case of the auxiliary elements 127 and 128 of the width of 5 mm used in the Experiment 1.

Figure 10:
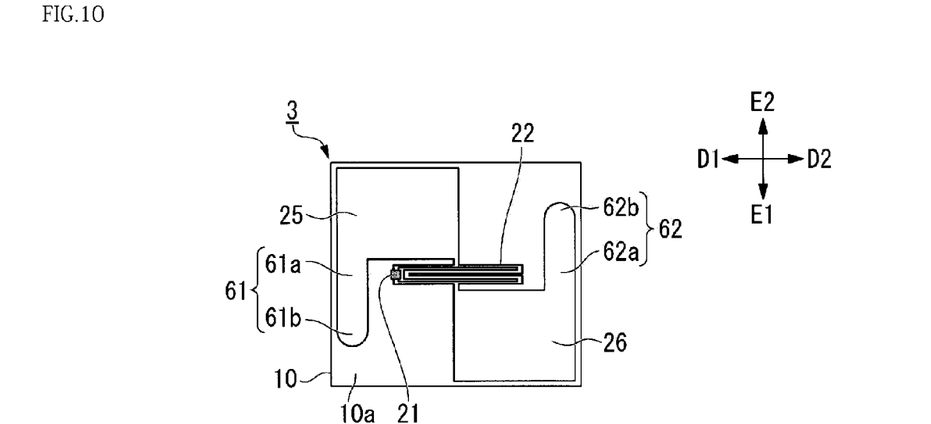
FIG. 10 is a plan view of the non-contact IC label according to a modified example of one embodiment of the present invention.

As a non-contact IC label 3 shown in FIG. 10, auxiliary elements 61 and 62 may be disposed. In the auxiliary element 61, a proximal end 61a of the auxiliary element 61 in the extending direction of the auxiliary element 61 is formed in a rectangular shape, and a distal end 61b has a tip formed in a semi-circular shape. In the auxiliary element 62, a proximal end 62a of the auxiliary element 6 in the extending direction of the auxiliary element 62 is formed in a rectangular shape, and a distal end 62b has a tip formed in a semi-circular shape.

In the non-contact IC label 3 having the above configuration, it is also revealed from an additional experiment that the communication range can be improved to the same extent as that of the conventional non-contact IC label 1.

Figure 11:
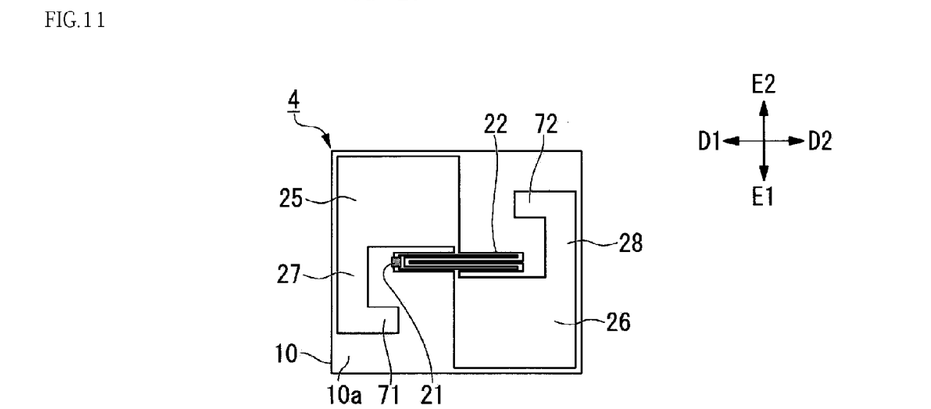
FIG. 11 is a plan view of the non-contact IC label according to a modified example of one embodiment of the present invention.

In a non-contact IC label 4 shown in FIG. 11, in addition to the components of the non-contact IC label 1 of the first embodiment, an additional element (first additional antenna section) 71 and an additional element (second additional antenna section) 72 may be provided.

The additional element 71 is disposed on the magnetic sheet 10 so as to extend from the distal end of the auxiliary element 27 in the second direction D2. The additional element 72 is disposed on the magnetic sheet 10 so as to extend from the distal end of the auxiliary element 28 in the first direction D1. The additional element 71 and the additional element 72 are formed in the same rectangular shape. The additional elements 71 and 72 and the circuit section 22 are spaced from each other and are not directly in contact with each other.

The additional elements 71 and 72 can be formed integrally with the circuit section 22, the antenna elements 25 and 26, and the auxiliary elements 27 and 28 by printing silver paste ink on the film.

The auxiliary element 27 and the additional element 71, and the auxiliary element 28 and the additional element 72 are generally formed in a hook shaped.

In the non-contact IC label 4 having the above configuration, it is also revealed from an additional experiment that the communication range can be improved to the same extent as that of the conventional non-contact IC label 1.

In the non-contact IC labels 2 to 4 of the modified examples, as shown in FIGS. 9 to 11, the auxiliary elements and the additional elements are shaped and positioned so as not to cause increase in the external dimensions of the label.

While one embodiment of the present invention was described in detail with reference to the drawings, the specific configuration is not limited to the above embodiment, and various modifications, combinations and omissions can be made without departing from the principle of the present invention. Further, each of the configurations shown in the examples of the above embodiment can be combined as appropriate.

For example, in the above embodiment, including the modified examples, the shapes of the auxiliary elements and the additional elements are described. However, the shapes of the auxiliary elements and the additional elements are not limited thereto, and may be any shape such as circular, oval and polygonal shape as long as it contributes to improvement in the communication range. Further, each of a pair of auxiliary elements in the non-contact IC label may be formed in different shapes or positioned in different arrangements. A pair of additional elements may also be formed in different shapes or positioned in different arrangements.

The adhesion layer 41 may optionally not be provided in the non-contact IC label.

REFERENCE SIGNS LIST 1, 2, 3, 4 non-contact IC label
10 magnetic sheet
10a one surface
21 IC chip
22 circuit section
25 antenna element (first antenna section)
25a first end portion
25b second end portion
26 antenna element (second antenna section)
26a first end portion
26b second end portion
27, 51, 61 auxiliary element (first auxiliary antenna section)
28, 52, 62 auxiliary element (second auxiliary antenna section)
61b, 62b distal end
71 additional element (first additional antenna section)
72 additional element (second additional antenna section)
D1 first direction
D2 second direction

What is claimed is:
1. A non-contact IC label comprising:
a magnetic sheet having a first surface and a second surface opposite to the first surface;
an IC chip disposed on the first surface of the magnetic sheet;
a first antenna section which is disposed on the magnetic sheet, and has a first end portion connected to the IC chip and a second end portion disposed away from the first end portion in a first direction on the first surface of the magnetic sheet;
a second antenna section which is disposed on the magnetic sheet, and has a first end portion connected to the IC chip and a second end portion disposed away from the first end portion in a second direction generally opposite to the first direction;
a circuit section disposed between the first end portion of the first antenna section and the first end portion of the second antenna section, connected to the first end portion of the first antenna section, the first end portion of the second antenna section, and the IC chip;
a first auxiliary antenna section which is disposed on the magnetic sheet, positioned on the second end portion of the first antenna section and projects from a side of the first antenna section located at a position close to the circuit section so as to extend in a direction which intersects with the first direction; and
a second auxiliary antenna section which is disposed on the magnetic sheet, positioned on the second end portion of the second antenna section and extends from a side of the second antenna section located at a position close to the circuit section so as to extend along a direction which intersects with the second direction, and,
wherein the first antenna section and the second antenna section are formed in the same rectangular shape in the plan view of the first surface of the magnetic sheet.

2. The non-contact IC label of claim 1, wherein the first auxiliary antenna section and the second auxiliary antenna section are each formed in the same rectangular shape in the plan view of the first surface of the magnetic sheet.

3. The non-contact IC label of claim 2, wherein communication between the non-contact IC label and a data reading device is performed via radio waves.

4. The non-contact IC label of claim 1, wherein a distal end of the first auxiliary antenna section and a distal end of the second auxiliary antenna section each has a tip formed in a semi-circular shape in the plan view of the first surface of the magnetic sheet.

5. The non-contact IC label of claim 4, wherein communication between the non-contact IC label and a data reading device is performed via radio waves.

6. The non-contact IC label of claim 1, further comprising:
a first additional antenna section which is disposed on the magnetic sheet and extends from the distal end of the first auxiliary antenna section in the second direction; and
a second additional antenna section which is disposed on the magnetic sheet and extends from the distal end of the second auxiliary antenna section in the first direction.

7. The non-contact IC label of claim 6, wherein communication between the non-contact IC label and a data reading device is performed via radio waves.

8. The non-contact IC label of claim 1, wherein communication between the non-contact IC label and a data reading device is performed via radio waves.

* * * * *